United States Patent
Gao (10) Patent No.: US 11,617,101 B2
(45) Date of Patent: Mar. 28, 2023

(54) COMMUNICATION DATA PROCESSING METHOD AND APPARATUS, ELECTRONIC DEVICE AND STORAGE MEDIUM

(71) Applicant: BEIJING XIAOMI MOBILE SOFTWARE CO., LTD., Beijing (CN)

(72) Inventor: Yi Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 125 days.

(21) Appl. No.: 17/026,295

(22) Filed: Sep. 20, 2020

(65) Prior Publication Data

US 2021/0314804 A1  Oct. 7, 2021

(30) Foreign Application Priority Data

Apr. 2, 2020 (CN) .......................... 202010254719.3

(51) Int. Cl.
*H04W 28/02* (2009.01)
(52) U.S. Cl.
CPC ............................... *H04W 28/0221* (2013.01)
(58) Field of Classification Search
None
See application file for complete search history.

(56) References Cited

U.S. PATENT DOCUMENTS

| | | | | |
|---|---|---|---|---|
| 3,639,014 A | * | 2/1972 | Sixsmith | F16C 27/02 384/114 |
| 10,433,255 B1 | * | 10/2019 | Oroskar | H04W 52/0277 |
| 11,269,977 B2 | * | 3/2022 | Turgeman | G06F 21/316 |
| 2004/0180701 A1 | * | 9/2004 | Livet | H04W 52/0261 455/574 |
| 2005/0114721 A1 | | 5/2005 | Azadet | |
| 2006/0205396 A1 | * | 9/2006 | Laroia | H04L 1/0015 455/422.1 |
| 2006/0270385 A1 | * | 11/2006 | Morris | H04W 52/0203 455/405 |
| 2008/0240009 A1 | * | 10/2008 | Min | H04W 52/286 370/311 |
| 2010/0020734 A1 | * | 1/2010 | Nakagawa | H04W 52/0261 370/311 |
| 2013/0144483 A1 | * | 6/2013 | Dabholkar | H04W 4/029 701/32.4 |
| 2019/0306851 A1 | * | 10/2019 | Xu | H04W 52/0251 |

(Continued)

FOREIGN PATENT DOCUMENTS

| | | |
|---|---|---|
| CN | 102929382 A | 2/2013 |
| CN | 103200318 A | 7/2013 |

(Continued)

OTHER PUBLICATIONS

European Search Report in the European application No. 20198449.9, dated Mar. 9, 2021.

*Primary Examiner* — Hassan A Phillips
*Assistant Examiner* — Gautam Sharma
(74) *Attorney, Agent, or Firm* — Syncoda LLC; Feng Ma (57) ABSTRACT

A method for processing communication data, applied to an electronic device, includes: monitoring power consumption of the electronic device; determining a speed limit parameter corresponding to the power consumption; and controlling a data transmission rate of the electronic device according to the speed limit parameter.

20 Claims, 3 Drawing Sheets

(56) References Cited

U.S. PATENT DOCUMENTS

| | | | |
|---|---|---|---|
| 2020/0015115 A1* | 1/2020 | Heo | G06F 9/4406 |
| 2020/0107228 A1* | 4/2020 | Wang | H04W 72/1284 |
| 2020/0221397 A1* | 7/2020 | Wu | H04W 52/367 |
| 2021/0014791 A1* | 1/2021 | Freda | H04W 52/0229 |
| 2021/0314804 A1* | 10/2021 | Gao | H04W 52/0261 |

FOREIGN PATENT DOCUMENTS

| | | |
|---|---|---|
| CN | 106792921 A | 5/2017 |
| CN | 109600821 A | 4/2019 |
| CN | 110708747 A | 1/2020 |
| CN | 110719138 A | 1/2020 |
| EP | 1536569 A1 | 6/2005 |

* cited by examiner

COMMUNICATION DATA PROCESSING METHOD AND APPARATUS, ELECTRONIC DEVICE AND STORAGE MEDIUM

CROSS-REFERENCE TO RELATED APPLICATION

This application claims priority to Chinese patent application No. 202010254719.3 filed on Apr. 2, 2020, the disclosure of which is hereby incorporated by reference in its entirety.

BACKGROUND

With the continuous development of the 5G (5th Generation Wireless Systems) technology, 5G electronic devices are widely used. The 5G has the performance characteristics such as high data rate, low latency, low cost, high capacity, large-scale device connection. However, due to the high data transmission rate and low latency of 5G communication, higher system power consumption is also required to maintain the 5G communication. Therefore, the system power consumption of a 5G electronic device is higher, and a terminal device with shorter endurance is difficult to ensure continuous and long-time use of a 5G network, thereby reducing the user experience.

SUMMARY

The disclosure relates to the technical field of communication, and more specifically to a method and an apparatus for processing communication data, an electronic device and a storage medium.

According to a first aspect of the embodiments of the disclosure, a method for processing communication data is provided. The method is applied to an electronic device and includes that: power consumption of the electronic device is monitored; a speed limit parameter corresponding to the power consumption is determined; and a data transmission rate of the electronic device is controlled according to the speed limit parameter.

According to a second aspect of the embodiments of the disclosure, an apparatus for processing communication data is provided. The apparatus is applied to an electronic device and includes: a monitoring portion, configured to monitor power consumption of the electronic device; a first determining portion, configured to determine a speed limit parameter corresponding to the power consumption; and a control portion, configured to control a data transmission rate of the electronic device according to the speed limit parameter.

According to a third aspect of the embodiments of the disclosure, an electronic device is provided. The electronic device at least includes: a processor and a memory configured to store executable instructions capable of running on the processor, where when the processor is configured to run the executable instructions, the processor implements any one of the steps in the method for processing communication data.

According to a fourth aspect of the embodiments of the disclosure, a non-transitory computer-readable storage medium is provided, having stored therein computer executable instructions, where the computer executable instructions, when being executed by a processor, implement any one of the steps in the method for processing communication data.

It should be understood that the above general descriptions and detailed descriptions below are only exemplary and explanatory and not intended to limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Figure 1:
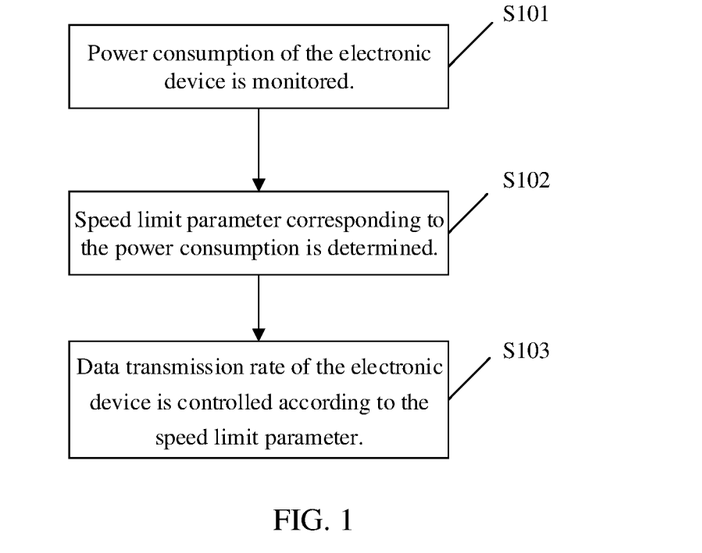
FIG. 1 is a flow diagram of a method for processing communication data according to some embodiments of the present disclosure.

FIG. 1 is a flow diagram of a method for processing communication data according to some embodiments of the present disclosure. The method is applied to an electronic device. As shown in FIG. 1, the method includes the following blocks S101, S102 and S103.

In S101, power consumption of the electronic device is monitored;

In S102, a speed limit parameter corresponding to the power consumption are determined; and In S103, a data transmission rate of the electronic device is controlled according to the speed limit parameter.

In some embodiments of the disclosure, the power consumption of the electronic device may be the total power consumption of an electronic device system, or the total power consumption of the electronic device for receiving and sending communication data. The data corresponding to power consumption may be acquired in real time by a system interface of the electronic device, or the power consumption data may be sampled at a certain time interval to acquire the power consumption data at each sampling time point.

Herein, there may be a certain function relationship between power consumptions and speed limit parameters, each of the power consumptions may correspond to a respective speed limit parameter, or different power consumption intervals may correspond to different speed limit parameters. Here, the speed limit parameter may be a speed range that allows data transmission, or may be a maximum rate that allows data transmission. In addition, the speed limit parameter may be only configured to limit the rate for sending data, or may also be only configured to limit the rate for receiving data, or may also be configured to limit the rate for sending and receiving data at the same time, which is not limited herein.

According to the above method, speed limit is performed on the data transmission (i.e., the data transmission rate is limited, or the performing speed limit in the present disclosure may be limiting the data transmission speed/rate of the electronic device) correspondingly by monitoring the power consumption of the electronic device, so that the balance between the power consumption and data transmission rate is realized. As a result, on one hand, the phenomenon of excessive power consumption caused by a higher data transmission rate is reduced, and on the other hand, the data transmission rate at a low power consumption is increased.

In some embodiments, the speed limit parameter includes the number of data packets received and sent in unit time. The step that the data transmission rate of the electronic device is controlled according to the speed limit parameter includes: the number of the data packets transmitted by an application data transmission interface in unit time is limited according to the speed limit parameter.

Here, the application data transmission interface is a data interface that is used to connect to an information server outside the electronic device through the Internet or a local area network. In some embodiments of the disclosure, the transmission speed/rate may be limited by displaying the number of the data packets transmitted by the application data transmission interface in unit time. The transmitted data packets include: the sent data packets and received data packets. Therefore, the transmission speed may be limited by limiting the number of the data packets received in unit time, or by limiting the number of the data packets sent in unit time, or may be limited by displaying the number of the received and sent data packets at the same time.

It should be noted that the above speed limit parameter may also include that: the number of the data packets that may be received and sent in unit time is not limited, that is, the transmission rate is not limited. When the power consumption, for example is less than a preset threshold, the corresponding speed limit parameter may be the unlimited speed; and when the power consumption is greater than the threshold, there are different respective speed limit parameters, and the transmission speed needs to be limited In some embodiments, the step that the number of the data packets transmitted by the application data transmission interface in a unit time is limited according to the speed limit parameters includes that:

if the number of the data packets to be received and sent in the current unit time exceeds a number limited by the speed limit parameter, data transmission is performed in the current unit time according to the number limited by the speed limit parameter, and the data packets whose number exceeds the limited number are transmitted in the subsequent unit time.

If the number of the data packets to be received and sent in a unit time exceeds the number limited by the speed limit parameter, sending or receiving of extra data packets will be stopped in the current unit time. At this time, the extra data packets may be discarded, waiting for retransmission in the next unit time, or directly delayed to be transmitted at the next unit time. Of course, if the extra data packets cannot be transmitted in the next unit time, transmission of the extra data packets may continue to be delayed to be performed at any subsequent unit time.

In some embodiments, an order of data transmission may be determined according to the waiting time of the data packet or the priority of data transmission, and the data is received and sent in the current unit time according to the order. The data which is not received and sent in the current unit time is delayed to be transmitted in the next unit time, and then received and sent sequentially according to a priority order in the next unit time. The priority of the above data transmission may be determined according to the urgent level of the data service, or may be determined according to the importance marked in the data. For example, since the urgent level of the URLLC (Ultra Reliable Low Latency Communications Conference) service is higher than that of the eMBB (Enhanced Mobile Broadband) service, the order of data transmission may be arranged accordingly.

In another embodiment, if there are data packets with a specific priority that need to be transmitted in the current unit time, but if the number of the data packets exceeds the number specified by the speed limit parameters, the data packets with the specific priority may still be allowed to be transmitted in a unit time. For example, the data packets with the specific priority involve alarm information of emergency help, personal safety and/or public safety, and may also include specific service types, such as voice call services, or data transmission services of user-specified applications. In other words, the speed limit implemented by the above speed limit parameters may not be an absolute speed limit, but may be dynamically changed according to actual service types and the urgent level of the data, thereby ensuring the transmission of important data and improving the use experience of a user.

In some embodiments, the application data transmission interface is an application layer interface, and at least includes a socket.

The application data transmission interface is the application layer interface, which realizes limit of data transmission rate by means of control at the application layer. In this way, compared with the speed limit at bottom layers, such as a data link layer and a network layer, more power consumption may be saved. Furthermore, since an application performs data communication with the Internet through the application layer interface of an operating system, the application layer interface may facilitate the unified management of the data communication of various applications of the electronic device.

In some embodiments of the disclosure, the application layer interface may be a socket. The socket is essentially an abstraction layer. An application may send or receive data through the socket which allows the application to insert input and output into the network and to communicate with other applications in the network. The socket includes a data port determined by the IP address and port number of the electronic device, and the applications implement point-to-point communication through the data port.

Therefore, in some embodiments of the disclosure, the limit of data transmission rate is realized directly by the socket, and according to the requirements of the speed limit parameters, only a preset number of data packets are read in a unit time and transmitted to the network layer for subsequent processing. In this way, there is no need to perform the speed limit at a bottom layer, so that the power consumption caused by the speed limit of the bottom layer is reduced.

Figure 2:
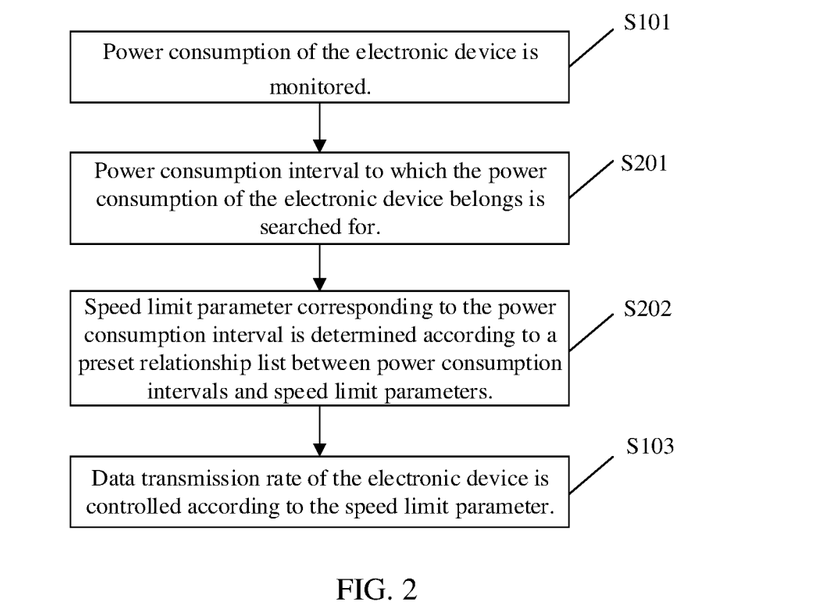
FIG. 2 is another flow diagram of a method for processing communication data according to some embodiments of the present disclosure.

In some embodiments, as shown in FIG. 2, the step that the speed limit parameters corresponding to the power consumption are determined in S102 includes S201 and S202.

In S201, a power consumption interval to which the power consumption of the electronic device belongs are searched for; and In S202, a speed limit parameter corresponding to the power consumption interval is determined according to a preset relationship list between power consumption intervals and speed limit parameters.

In some embodiments of the disclosure, the power consumption of the electronic device may be configured with different power consumption intervals, and different power consumption intervals correspond to different speed limit parameters, which are recorded in the preset relationship list. If the current power consumption of the electronic device is in a power consumption interval, the transmission of communication data is controlled according to the speed limit parameter corresponding to the power consumption interval.

The power consumption of the above electronic device may be the electric energy consumption of the operating system in a unit time obtained by monitoring the data of the operating system of the electronic device, or may be the charge consumption in a unit time obtained by monitoring data of the charge consumption of batteries in the electronic device.

At least two different power consumption intervals are required for the above relationship list, and in the relationship list, the power consumption is negatively correlated to the data transmission rate limited by the speed limit parameters. In other words, the lower the power consumption, the higher the transmission rate corresponding to the speed limit parameter, and the higher the power consumption, the lower the transmission rate corresponding to the speed limit parameter. In this way, when the power consumption of the electronic device is lower, it can be used at a higher data transmission rate to improve the user experience of the application; and when the power consumption of the electronic device is higher, the data transmission rate may be reduced to save the power consumption.

In some applications, according to the technical solutions of embodiments of the disclosure, whether to perform speed limit (i.e., to limit the transmission speed) according to the above preset relationship list may also be determined according to the remaining charge of the electronic device. If the remaining charge of the electronic device is sufficient, or when the electronic device is connected to an external charge power supply, the speed limit may not be performed to ensure the user experience of the application. When the remaining charge of the electronic device is lower than the preset threshold, the speed limit is performed according to the corresponding relationship between the power consumptions and the speed limit parameters, so that the power consumption is saved, thereby improving the endurance of the electronic device.

Figure 3:
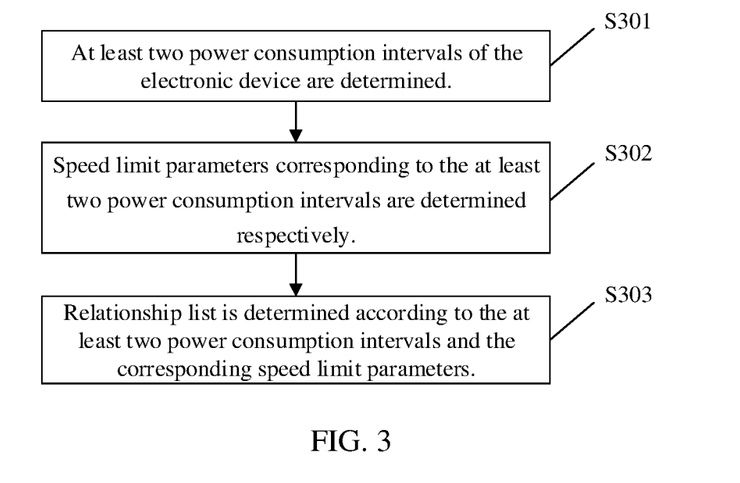
FIG. 3 is a flow diagram of generating a relationship list according to some embodiments of the present disclosure.

In some embodiments, as shown in FIG. 3, the method further includes the blocks S301, S302, S303 of generating the above relationship list.

In S301, at least two power consumption intervals of the electronic device are determined.

In S302, the speed limit parameters corresponding to the at least two power consumption intervals are respectively determined.

In S303, the relationship list is determined according to the at least two power consumption intervals and the corresponding speed limit parameters.

In some embodiments of the disclosure, an implementation for presetting the relationship list is provided as follows. The power consumption of the electronic device is divided into a plurality of power consumption intervals, and a corresponding speed limit parameter is matched for each of the plurality of power consumption intervals, so as to generate the above relationship list. This procedure may be performed before the electronic device is shipped from the factory to configure a complete relationship list, or may also be set by a user after the electronic device is shipped from the factory and may be adjusted according to different demands.

The embodiments of the disclosure further provide the following examples.

The power consumption of a 5G mobile phone is generally higher. In order to save the power consumption and ensure the endurance of the mobile phone, the speed limit may be performed at the bottom layer of the system, or the 5G network may be disconnected. However, the speed limit implemented at the bottom layer may also have higher power consumption, and disconnection of the 5G network will reduce the use experience of the mobile phone. Therefore, in some embodiments of the disclosure, the speed limit may be implemented by adopting speed limit at the application layer.

In some embodiments of the disclosure, a power consumption monitoring portion set in the application layer of a mobile phone is used to monitor the interface of an operating system and read the power consumption value of the operating system, such as 500 mAh (milliamp hour). The power consumption monitoring portion may include a plurality of power consumption intervals. When the power consumption value is lower than the minimum power consumption threshold, the transmission speed/rate of the mobile phone may be not limited. When the power consumption value is greater than the power consumption threshold, different power consumption intervals correspond to different speed limit parameters, that is, the maximum speed threshold. As shown in Table 1 below, the data transmission rate is controlled according to the speed limit threshold corresponding to each of the power consumption intervals in Table 1.

TABLE 1

| Power consumption interval | Speed limit (the number of data packets transmitted per second) |
| --- | --- |
| 500-600 mAh | 1000 data packets per second |
| 600-700 mAh | 800 data packets per second |
| 700-800 mAh | 600 data packets per second |
| . . . | . . . |

In Table 1, the higher the power consumption, the fewer data packets may be transmitted per second, which is for the reason that the power consumption is higher if the more data packets are transmitted per second. The power consumption intervals and the corresponding speed limit parameters in Table 1 may be adjusted according to actual needs, and there is no limitation here.

In some embodiments of the disclosure, an application layer speed limit module may be set at the application layer to serve as a part of network modules of the operating system, since any application performs data packet interaction with the network through the application layer interface of the operating system.

The application layer speed limit module may be configured to control the transmission of data packets by the socket. The socket is an abstraction layer, the application may send or receive data by the socket, and the socket may be opened, read, written and closed like a file. The socket allows the application to insert I/O (Input/Output) into the network and communicate with other applications in the network.

The manner of limiting the data transmission rate by the socket is that when an application calls the data packets transmitted by a socket interface, the data packets are read according to the speed limit parameters. For example, when the speed limit is 500 data packets per second, the socket interface will at most read 500 data packets per second and transmit the data packets to the network layer for processing, and then read 500 data packets in the next second.

When monitoring that the power consumption data reaches within a certain power consumption interval, the power consumption monitoring portion sends an instruction to the application layer speed limit module to notify the application layer speed limit module of the required speed limit parameters. After receiving the instruction, the application layer speed limit module reads the speed limit parameters included in the instruction. Then, when applications has a data transmission requirement, a corresponding number of data packets are read per second according to the speed limit parameter, and when the value of the number of the data packets limited by the speed limit parameter is reached, the extra data packets are transmitted in the next second.

In this way, under the control of the speed limit, the system power consumption may be increased accordingly, and the data transmission rate may be further increased, thereby achieving the balance between the power consumption and the data transmission rate.

Through the technical solutions of the embodiments of the disclosure, since the application interface can display the transmission rate of the data packets, the number of the data packets corresponding to the speed limit may be directly read, so that unnecessary power consumption is reduced. Furthermore, the transmission rate of the data packets may be dynamically adjusted according to the change of the value of power consumption, so that the power consumption may be effectively saved without affecting the use of the electronic device.

Figure 4:
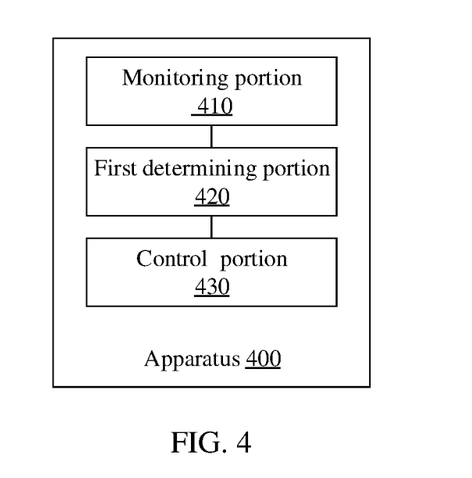
FIG. 4 is a structural block diagram of an apparatus for processing communication data according to some embodiments of the present disclosure.

FIG. 4 is a block diagram of an apparatus for processing communication data according to some embodiments of the present disclosure. Referring to FIG. 4, the apparatus includes a monitoring portion 410, a first determining portion 420 and a control portion 430.

The monitoring portion 410 is configured to monitor the power consumption of the electronic device;

the first determining portion 420 is configured to determine speed limit parameter corresponding to the power consumption; and the control portion 430 is configured to control the data transmission rate of the electronic device according to the speed limit parameter.

In some embodiments, the speed limit parameter may include the number of data packets received and sent in unit time.

The control portion may include: a limiting sub-portion configured to limit the number of the data packets transmitted by an application data transmission interface in unit time according to the speed limit parameter.

In some embodiments, the limiting sub-portion is specifically configured to: if the number of the data packets to be received and sent in the current unit time exceeds the number limited by the speed limit parameters, perform data transmission in the current unit time according to the number limited by the speed limit parameters, and transmit the data packets whose number exceeds the limited number in the subsequent unit time.

In some embodiments, the application data transmission interface is an application layer interface, and at least includes a socket.

In some embodiments, the first determining portion includes: a searching sub-portion configured to search for a power consumption interval to which the power consumption of the electronic device belongs; and a determining sub-portion configured to determine the speed limit parameter corresponding to the power consumption interval according to a preset relationship list between power consumption intervals and speed limit parameters.

In some embodiments, the apparatus further includes:

a second determining portion configured to determine at least two power consumption intervals of the electronic device;

a third determining portion configured to respectively determine speed limit parameters corresponding to the at least two power consumption intervals; and a fourth determining portion configured to determine the relationship list according to the at least two power consumption intervals and the corresponding speed limit parameters.

With respect to the apparatus in the above embodiments, the specific manners for performing operations for individual portions therein have been described in detail in some embodiments of the method, which will not be elaborated herein.

Figure 5:
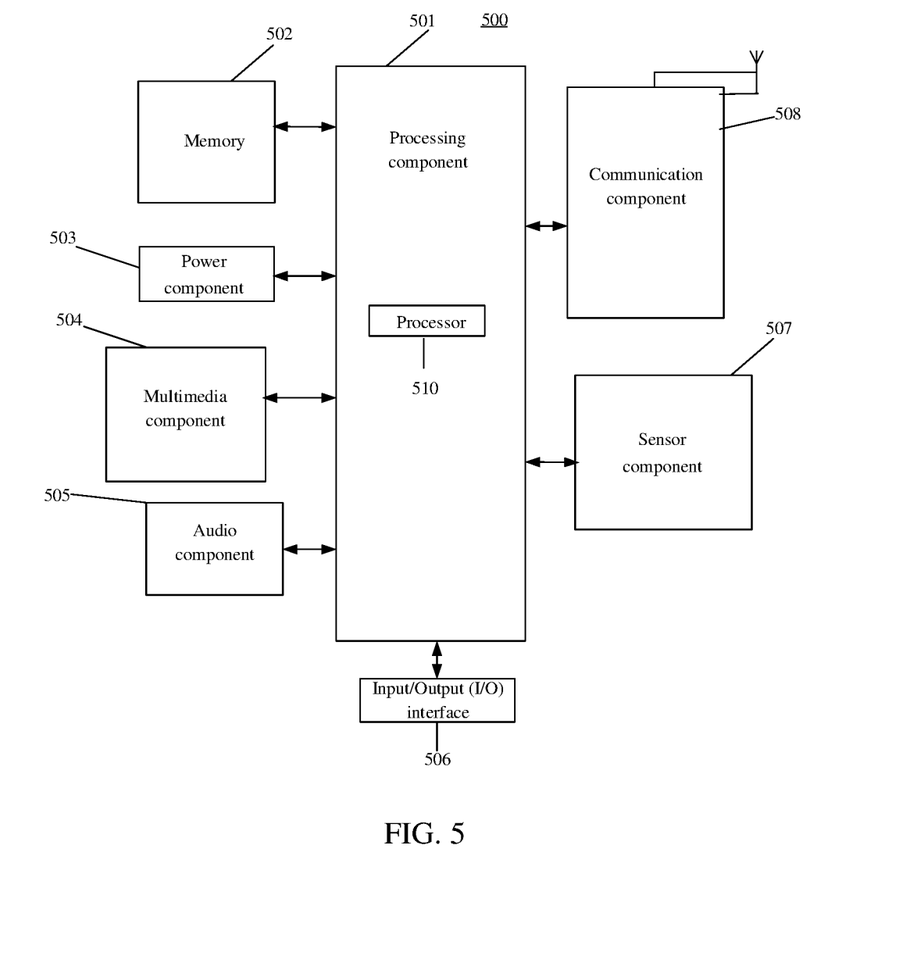
FIG. 5 is a block diagram of a physical structure of an electronic device according to some embodiments of the present disclosure.

Referring to FIG. 5, the electronic device 500 may include one or more of the following components: a processing component 501, a memory 502, a power component 503, a multimedia component 504, an audio component 505, an Input/Output (I/O) interface 506, a sensor component 507, and a communication component 508.

The processing component 501 typically controls overall operations of the electronic device 500, such as operations associated with display, telephone calls, data communications, camera operations, and recording operations. The processing component 501 may include one or more processors 510 to execute instructions to perform all or part of the steps of the method described above. Moreover, the processing component 501 may further include one or more modules which facilitate the interaction between the processing component 501 and other components. For example, the processing component 501 may include a multimedia module to facilitate the interaction between the multimedia component 504 and the processing component 501.

The memory 510 is configured to store various types of data to support the operation of the electronic device 500. Examples of such data include instructions for any applications or methods operated on the electronic device 500, contact data, phonebook data, messages, pictures, videos, etc. The memory 502 may be implemented using any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 503 provides power to various components of the electronic device 500. The power component 503 may include: a power management system, one or more power sources, and any other components associated with the generation, management and distribution of power in the electronic device 500.

The multimedia component 504 includes a screen providing an output interface between the electronic device 500 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touch, swipe, and gestures on the TP. The touch sensor may not only sense a boundary of a touch or swipe action, but also detect duration and pressure related to the touch or swipe action. In some examples, the multimedia component 504 includes a front camera and/or a rear camera. The front camera and/or the rear camera may receive external multimedia data while the electronic device 500 is in an operation mode, such as a photographing mode or a video mode. Each front camera and each rear camera may be fixed optical lens systems or may have focal lengths and optical zoom capabilities.

The audio component 505 is configured to output and/or input audio signals. For example, the audio component 505 includes a Microphone (MIC) configured to receive external audio signals when the electronic device 500 is in an operation mode, such as a call mode, a recording mode, and a voice recognition mode. The received audio signals may be further stored in the memory 510 or transmitted via the communication component 508. In some examples, the audio component 505 may further include a speaker to output audio signals.

The I/O interface 506 provides an interface between the processing component 501 and peripheral interface modules, such as a keyboard, a click wheel, or buttons. These buttons may include, but not limited to: a home button, a volume button, a start button, and a lock button.

The sensor component 507 includes one or more sensors to provide status assessments of various aspects of the electronic device 500. For example, the sensor component 507 may detect an open/closed status of the electronic device 500, and relative positioning of components. For example, the components are the display and the keypad of the electronic device 500. The sensor component 507 may also detect a change in position of the electronic device 500 or a component of the electronic device 500, a presence or absence of user contact with the electronic device 500, an orientation or an acceleration/deceleration of the electronic device 500, and a change in temperature of the electronic device 500. The sensor component 507 may include a proximity sensor configured to detect the presence of nearby objects without any physical contact. The sensor component 507 may also include light sensors, such as CMOS or CCD image sensors, for use in imaging applications. In some examples, the sensor component 507 may also include an acceleration sensor, a gyroscope sensor, a magnetic sensor, a pressure sensor, or a temperature sensor.

The communication component 508 is configured to facilitate wired or wireless communication between the electronic device 500 and other devices. The electronic device 500 may access a wireless network based on a communication standard, such as Wi-Fi, 2G, 3G, 4G, or 5G, or a combination thereof. In an exemplary example, the communication component 508 receives broadcast signals or broadcast related information from an external broadcast management system via a broadcast channel. In an exemplary example, the communication component 508 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, or other technologies.

In an exemplary example, the electronic device 500 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, for performing the above described methods.

In an exemplary example, there is also provided a non-transitory computer-readable storage medium including instructions, such as a memory 502 including an instruction. The instruction may be executed by a processor 510 of the electronic device 500 to complete the above method. For example, the non-transitory computer-readable storage medium may be an ROM, an RAM, a CD-ROM, a magnetic tape, a floppy disk, an optical data storage device, and the like.

A non-transitory computer-readable storage medium having instructions stored therein is provided. The instructions in the storage medium, when being executed by a processor of a mobile terminal, enable the mobile terminal to implement any of the method provided in the above embodiments.

Various embodiments of the disclosure can have one or more of the following advantages. The data transmission rate is limited correspondingly by monitoring the power consumption of the electronic device, so that the balance between the power consumption and the data transmission rate is realized. As a result, on one hand, the phenomenon of excessive power consumption caused by a higher data transmission rate is reduced, and on the other hand, the data transmission rate at low power consumption is increased.

The various device components, circuits, modules, units, blocks, or portions may have modular configurations, or are composed of discrete components, but nonetheless can be referred to as "modules" or "portions," etc., in general. In other words, the "components," "circuits," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for processing communication data, applied to an electronic device and comprising:
   monitoring power consumption of the electronic device;
   determining a speed limit parameter based on the power consumption; and
   controlling a data transmission rate of the electronic device according to the speed limit parameter,
   wherein the speed limit parameter comprises a number of data packets received and sent in unit time,
   wherein controlling the data transmission rate of the electronic device according to the speed limit parameter comprises:
   limiting, according to the speed limit parameter, a number of the data packets transmitted by an application data transmission interface in unit time.

2. The method of claim 1, wherein the limiting, according to the speed limit parameter, the number of the data packets transmitted by the application data transmission interface in unit time comprises:

if a number of data packets to be received and sent in present unit time exceeds a number limited by the speed limit parameter, performing data transmission in the present unit time according to the number limited by the speed limit parameters, and transmitting data packets whose number exceeds the limited number in subsequent unit time.

3. The method of claim 1, wherein the application data transmission interface is an application layer interface, and comprises a socket.

4. The method of claim 1, wherein the determining the speed limit parameter based on the power consumption comprises:

searching for a power consumption interval to which the power consumption of the electronic device belongs; and determining the speed limit parameter corresponding to the power consumption interval according to a preset relationship list between power consumption intervals and speed limit parameters.

5. The method of claim 4, further comprising:
determining at least two power consumption intervals for the electronic device;
respectively determining speed limit parameters corresponding to the at least two power consumption intervals; and
determining the relationship list according to the at least two power consumption intervals and the corresponding speed limit parameters.

6. An electronic device implementing the method of claim 1, wherein the electronic device is configured to limit the data transmission rate correspondingly by monitoring the power consumption of the electronic device, to thereby realize a balance between the power consumption and the data transmission rate, reduce excessive power consumption caused by a higher data transmission rate, and increase the data transmission rate at a low power consumption.

7. The electronic device of claim 6, further comprising a display screen, wherein the electronic device is a 5G electronic device configured to realize the balance between the power consumption and the data transmission rate in a 5G network.

8. The method of claim 1, wherein different power consumptions correspond to different speed limit parameters.

9. An apparatus for processing communication data, applied to an electronic device and comprising: a processor and memory for storing instructions executable by the processor, wherein the processor is configured to:
monitor power consumption of the electronic device;
determine a speed limit parameter based on the power consumption; and
control a data transmission rate of the electronic device according to the speed limit parameter,
wherein the speed limit parameter comprises a number of data packets received and sent in unit time,
wherein the processor is further configured to:
limit, according to the speed limit parameter, a number of the data packets transmitted by an application data transmission interface in unit time.

10. The apparatus of claim 9, wherein the processor is further configured to:

responsive to that a number of data packets to be received and sent in present unit time exceeds a number limited by the speed limit parameters, perform data transmission in the present unit time according to the number limited by the speed limit parameters, and transmit the data packets whose number exceeds the limited number in subsequent unit time.

11. The apparatus of claim 9, wherein the application data transmission interface is an application layer interface, and comprises a socket.

12. The apparatus of claim 9, wherein the processor is configured to:

search for a power consumption interval to which the power consumption of the electronic device belongs; and determine the speed limit parameter corresponding to the power consumption interval according to a preset relationship list between power consumption intervals and speed limit parameters.

13. The apparatus of claim 12, wherein the processor is further configured to:

determine at least two power consumption intervals for the electronic device;
respectively determine speed limit parameters corresponding to the at least two power consumption intervals; and
determine the relationship list according to the at least two power consumption intervals and their corresponding speed limit parameters.

14. The apparatus of claim 9, wherein different power consumptions correspond to different speed limit parameters.

15. A non-transitory computer-readable storage medium, having stored therein computer executable instructions that, when being executed by a processor, enable the processor to implement the communication data processing method, the method comprising:

monitoring power consumption of the electronic device;
determining a speed limit parameter based on the power consumption; and
controlling a data transmission rate of the electronic device according to the speed limit parameter,
wherein the speed limit parameter comprises a number of data packets received and sent in unit time,
wherein controlling the data transmission rate of the electronic device according to the speed limit parameter comprises:
limiting, according to the speed limit parameter, a number of the data packets transmitted by an application data transmission interface in unit time.

16. The non-transitory computer-readable storage medium of claim 15, wherein the limiting, according to the speed limit parameter, the number of the data packets transmitted by the application data transmission interface in unit time comprises:

responsive to that a number of data packets to be received and sent in present unit time exceeds a number limited by the speed limit parameter, performing data transmission in the present unit time according to the number limited by the speed limit parameters, and transmitting data packets whose number exceeds the limited number in subsequent unit time.

17. The non-transitory computer-readable storage medium of claim 15, wherein the application data transmission interface is an application layer interface, and comprises a socket.

18. The non-transitory computer-readable storage medium of claim 15, wherein determining the speed limit parameter corresponding to the power consumption comprises:
- searching for a power consumption interval to which the power consumption of the electronic device belongs; and
- determining the speed limit parameter corresponding to the power consumption interval according to a preset relationship list between power consumption intervals and speed limit parameters.

19. The non-transitory computer-readable storage medium of claim 18, further comprising:
- determining at least two power consumption intervals for the electronic device;
- respectively determining speed limit parameters corresponding to the at least two power consumption intervals; and
- determining the relationship list according to the at least two power consumption intervals and the corresponding speed limit parameters.

20. The non-transitory computer-readable storage medium of claim 15, wherein different power consumptions correspond to different speed limit parameters.

\* \* \* \* \*